United States Patent
Miller et al.

(10) Patent No.: US 8,615,743 B2
(45) Date of Patent: Dec. 24, 2013

(54) ADAPTIVE COMPILED CODE

(75) Inventors: James S. Miller, Bellevue, WA (US); Thomas E. Quinn, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1919 days.

(21) Appl. No.: 11/276,362

(22) Filed: Feb. 27, 2006

(65) Prior Publication Data

US 2007/0240120 A1 Oct. 11, 2007

(51) Int. Cl.
*G06F 9/44* (2006.01)
*G06F 9/45* (2006.01)
*H04L 29/06* (2006.01)

(52) U.S. Cl.
USPC .......... 717/136; 717/124; 717/127; 717/151; 713/156

(58) Field of Classification Search
None
See application file for complete search history.

(56) References Cited

U.S. PATENT DOCUMENTS

| | | | |
|---|---|---|---|
| 5,655,122 A | 8/1997 | Wu | |
| 5,748,966 A * | 5/1998 | Sato | 717/131 |
| 5,857,104 A | 1/1999 | Natarjan et al. | |
| 6,003,095 A | 12/1999 | Pekowski | |
| 6,182,153 B1 * | 1/2001 | Hollberg et al. | 719/315 |
| 6,314,566 B1 | 11/2001 | Arrouye et al. | |
| 6,321,377 B1 * | 11/2001 | Beadle et al. | 717/148 |
| 6,463,582 B1 * | 10/2002 | Lethin et al. | 717/158 |
| 6,484,313 B1 * | 11/2002 | Trowbridge et al. | 717/146 |
| 6,560,774 B1 * | 5/2003 | Gordon et al. | 717/146 |
| 6,658,657 B1 * | 12/2003 | Lueh | 717/158 |
| 6,851,108 B1 * | 2/2005 | Syme et al. | 717/146 |
| 6,862,728 B2 * | 3/2005 | Darnell et al. | 717/148 |
| 6,886,094 B1 * | 4/2005 | Blandy | 712/244 |
| 6,901,587 B2 * | 5/2005 | Kramskoy et al. | 717/154 |
| 6,910,206 B1 * | 6/2005 | Nevill | 717/153 |
| 6,993,755 B1 * | 1/2006 | Ungar | 717/158 |
| 7,076,785 B2 * | 7/2006 | Mishra et al. | 719/316 |
| 7,155,606 B1 * | 12/2006 | Smith et al. | 713/156 |
| 7,296,257 B1 * | 11/2007 | Dibble et al. | 717/127 |
| 7,647,587 B2 * | 1/2010 | Knoblock et al. | 717/151 |
| 7,770,161 B2 * | 8/2010 | Mitran et al. | 717/151 |
| 8,127,280 B2 * | 2/2012 | Thomas et al. | 717/136 |
| 2002/0129177 A1 | 9/2002 | McGuire et al. | |
| 2002/0147969 A1 * | 10/2002 | Lethin et al. | 717/138 |
| 2002/0169999 A1 * | 11/2002 | Bhansali et al. | 714/26 |
| 2004/0039964 A1 * | 2/2004 | Russell et al. | 714/25 |

(Continued)

FOREIGN PATENT DOCUMENTS

| EP | 1056004 A | 11/2000 |
|---|---|---|
| EP | 1598739 A1 | 11/2005 |

(Continued)

OTHER PUBLICATIONS

Andreas Rossberg "The Missing Link—Dynamic Components for ML", [Online], ACM-2006, pp. 1-12, [Retrieved from Internet on Aug. 20, 2013], <http://www.mpi-sws.org/~rossberg/papers/Rossberg%20-%20The%20Missing%20Link.pdf>.*

(Continued)

*Primary Examiner* — Thuy Dao
*Assistant Examiner* — Ziaul A Chowdhury

(57) ABSTRACT

In a managed execution environment, an error may be deferred until execution of the application, program, function, or other assemblage of code reaches a point at which calling the reference to a module associated with a missing type or type member becomes inevitable.

20 Claims, 4 Drawing Sheets

(56) References Cited

U.S. PATENT DOCUMENTS

| | | | |
|---|---|---|---|
| 2004/0268095 A1 | 12/2004 | Shpeisman | |
| 2004/0268330 A1* | 12/2004 | Grover et al. | 717/146 |
| 2005/0081194 A1* | 4/2005 | Knoblock et al. | 717/151 |
| 2005/0172286 A1 | 8/2005 | Brumme et al. | |
| 2006/0206875 A1* | 9/2006 | Ullmann et al. | 717/136 |
| 2007/0079290 A1* | 4/2007 | Roth | 717/124 |
| 2007/0150880 A1* | 6/2007 | Mitran et al. | 717/161 |
| 2007/0169036 A1* | 7/2007 | Garner et al. | 717/143 |
| 2007/0240120 A1* | 10/2007 | Miller et al. | 717/126 |
| 2011/0307864 A1* | 12/2011 | Grechanik et al. | 717/124 |

FOREIGN PATENT DOCUMENTS

| | | |
|---|---|---|
| JP | S63-163636 | 7/1988 |
| JP | 2001-051741 | 2/2001 |
| JP | 2002-540522 | 11/2002 |

OTHER PUBLICATIONS

Luca Cardelli, "Typeful Programming", [Online], Springer-1991, pp. 1-64, [Retrieved from Internet on Aug. 20, 2013], <http://www.daimi.au.dk/~madst/tool/papers/typeful.pdf>.*

Alfons Laarman, "Achieving QVTO & ATL Interoperability an Experience Report on the Realization of a QVTO to ATL Compiler", [Online], 2009, pp. 1-15, <http://doc.utwente.nl/67522/1/QVTATLInteroperability.pdf>.*

Richard P. Morton et al., "Merging the ADA Compiler Evaluation Capability (ACEC) and the ADA Evaluation System (AES)", [Online], Oct. 1989, pp. 1-53, <http://www.dtic.mil/dtic/tr/fulltext/u2/a224583.pdf>.*

International Search Report, PCT/US2007/002320 Dated May 22, 2007. pp. 1-8.

Pietrek, M.; "Under the Hood"; Microsoft System Journal Japanese Edition; No. 59; ASCII Corporation; Japan; Feb. 18, 1999; p. 114.

JP Patent Application 2008-556331; Notice of Rejection dated Mar. 30, 2012; 7 pages.

EP Patent Application 07717090.0; Summons to Oral Proceedings dated Oct. 28, 2011.

EP Patent Application 07717090.0; Second Office Action dated Apr. 18, 2011; 8 pages.

CN Patent Application 200780006538.1; Notice on Reexamination dated Jul. 25, 2012.

CN Patent Application 200780006538.1; Second Office Action dated Aug. 8, 2011.

Arnold, et al.; "A Survey of Adaptive Optimization in Virtual Machines"; Proceedings of the IEEE; vol. 93; Feb. 2005; pp. 449-466.

* cited by examiner

ADAPTIVE COMPILED CODE

BACKGROUND

Applications, programs, functions, and other assemblages of programmable and executable code are typically written for third party (ie., "customer") usage. Therefore, effective code is written in such a manner that third party usage scenarios are enabled and meet third party expectations. However, such expectations may be difficult to meet when an application, program, function, or other assemblage of code that has been designed to run on an existing platform attempts to run on an older, or otherwise different, version of the platform.

SUMMARY

When an application, program, function, or other assemblage of code attempts to run on an older, or otherwise different, version of the platform on which it was generated, an error associated with a missing type or type member may be deferred until execution of the application, program, function, or other assemblage of code reaches a point at which calling a reference to the missing type or type member becomes inevitable.

DESCRIPTION OF THE DRAWINGS

The present description references the following figures.

DETAILED DESCRIPTION

Tools, systems, and methodologies for compiling adaptive code and executing the adaptive compiled code are described herein. Further, the description pertaining to at least one of compiling and executing one or more applications, programs, functions, or other assemblage of code having at least one adaptive compiled module, may relate to tools, systems, processes, instructions, techniques, and routines that may be utilized to defer an error associated therewith. That is, the aforementioned tools, systems, processes, instructions, techniques, and routines may be utilized to defer one or more errors associated with a reference in the compiled code until a call to the reference is, at least, statistically inevitable. The aforementioned tools, systems, and processes may be implemented in one or more devices, or nodes, in a network environment.

"Module," as described herein, may refer to separate entities such as methods, classes, DLLs (dynamic link libraries), frameworks, etc., that may utilize common physical and/or logical resources.

"Assemblage," as described herein, may refer to a unit of deployment for code.

Figure 1:
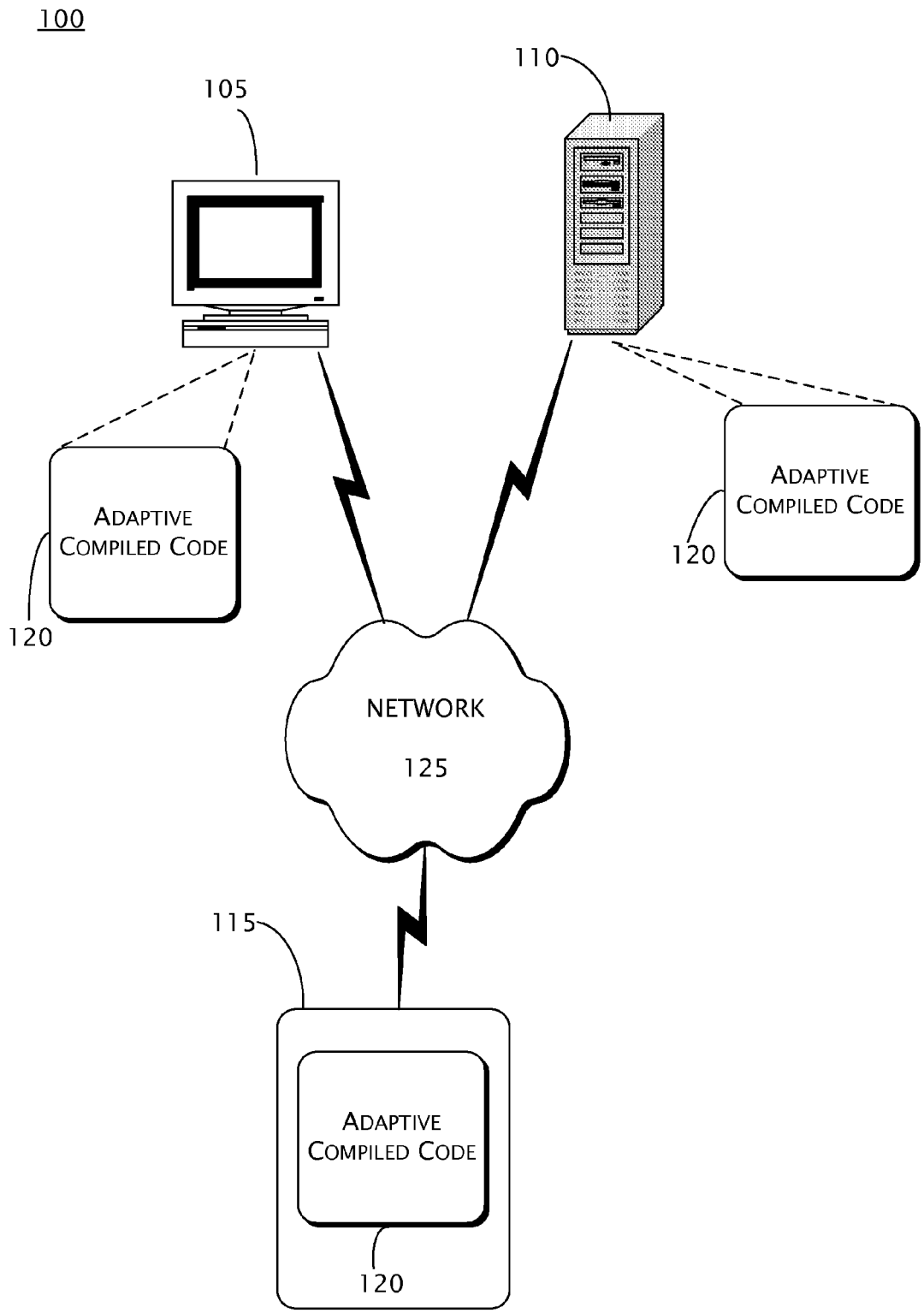
FIG. 1 shows devices communicating over a network, with the devices implementing example technologies related to adaptive compiled code.

FIG. 1 shows example network environment 100 in which example technologies may be implemented for compiling adaptive code and executing one or more applications, programs, functions, other code having at least one adaptive compiled module. However, such example technologies are not limited to network environments. Such technologies may include, but are not limited to, tools, methodologies (e.g., techniques), and systems, associated with adaptive compiled code 120, as described herein. In FIG. 1, client device 105, server device 110, and "other" device 115 may be communicatively coupled to one another via network 125; and, further, at least one of client device 105, server device 110, and "other" device 115 may be capable of implementing the aforementioned technologies.

Client device 105 may represent at least one of a variety of known computing devices, including a desktop personal computer (PC), workstation, mainframe computer, Internet appliance, set-top box, or gaming console, that is able to implement example technologies for at least one of producing and utilizing adaptive compiled code 120. Client device 105 may further represent at least one device that is capable of being associated with network 125 by a wired and/or wireless link, including a mobile (ie., cellular) telephone, personal digital assistant (PDA), laptop computer, etc. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation for at least one of compiling and utilizing adaptive compiled code 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may represent any further device that is capable of compiling and/or utilizing adaptive compiled code 120 according to one or more of the example technologies described herein. That is, "other" device 115 may represent a device that is capable of compiling code or receiving compiled code for which one or more errors associated with a reference in the compiled code may be deferred until a call to the reference is, at least, statistically inevitable. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as an 802.11 system or, on a larger scale, a wide area network (i.e., WAN"); or a personal area network (ie., PAN), such as Bluetooth.

Computer architecture in at least one of devices 105, 110, and 115 has typically defined computing platforms in terms of hardware and software. Software for computing devices has been categorized into groups, based on function, which may include: a hardware abstraction layer (alternatively referred to as a "HAL"), an operating system (alternatively referred to as "OS"), and applications.

A runtime execution environment may reside between an OS and an application, program, function, or other assemblage of code. The runtime execution environment may serve as a space in which the application, program, function, or other assemblage of code may execute specific tasks on any one or more of processing devices 105, 110, and 115. More particularly, a runtime execution environment may enhance the reliability of the execution of an application, program, function, or other assemblage of code on a growing range of processing devices 105, 110, and 105, including servers, desktop computers, laptop computers, and mobile processing/communication devices by providing a layer of abstraction and services for an application running on such devices, and by further providing the application, program, function, or other assemblage of code with capabilities including memory management and configuration thereof.

A runtime execution environment may serve as at least one of a programming and an execution platform. As a programming platform, a runtime execution environment may compile one or more targeted applications, programs, functions, or other assemblages of code, which may be written in one of multiple computing languages, into an intermediate language (hereafter "IL") or bytecode. IL is typically independent of the platform, and the central processing unit (hereafter "CPU") executes IL. In fact, IL is a higher level language than many CPU machine languages.

As an execution platform, a runtime execution environment may interpret compiled IL into native machine instructions. A runtime execution environment may utilize either an interpreter or a compiler (e.g., "just-in-time," alternatively "JIT," compiler) to execute such instructions. Regardless, the native machine instructions may then be directly executed by the CPU. Since IL is CPU-independent, IL may execute on any CPU platform as long as the OS running on that CPU platform hosts an appropriate runtime execution environment.

Alternatively, at least portions of applications, programs, functions, or other assemblages of code may be precompiled and loaded as one or more native image files in the runtime execution environment, thus circumventing CPU consumption required for compilation. Effectively, the precompiled portions are software modules that are distributed in an IL format (e.g., assemblies, methods, or types) rather than in a native platform execution format. A source of such precompiled IL may be disposed in either of a non-managed execution environment or a separate implementation of a runtime execution environment on a same or separate one of devices 105, 110, and 115. The source may deploy the precompiled IL during or before install time for the application, program, method, function, or other assemblage of code to which the precompiled IL corresponds.

Regardless, examples of runtime environments, in which technologies for compiling and/or utilizing adaptive compiled code 120 may be implemented, include: Visual Basic runtime environment; Java® Virtual Machine runtime environment that is used to run, e.g., Java® routines; or Common Language Runtime (CLR) to compile, e.g., Microsoft.NET™ applications into machine language before executing a calling routine. However, this listing of runtime environments provides examples only. The example technologies described herein are not limited to just these managed execution environments. More particularly, the example implementations are not just limited to managed execution environments, for one or more examples may be implemented within testing environments and/or unmanaged execution environments.

An application, program, function, or other assemblage of code compiled into IL may be referred to as "managed code," and that is why a runtime execution environment may be alternatively referred to as a "managed execution environment." It is noted that code that does not utilize a runtime execution environment to execute may be referred to as a native code application.

Figure 2:
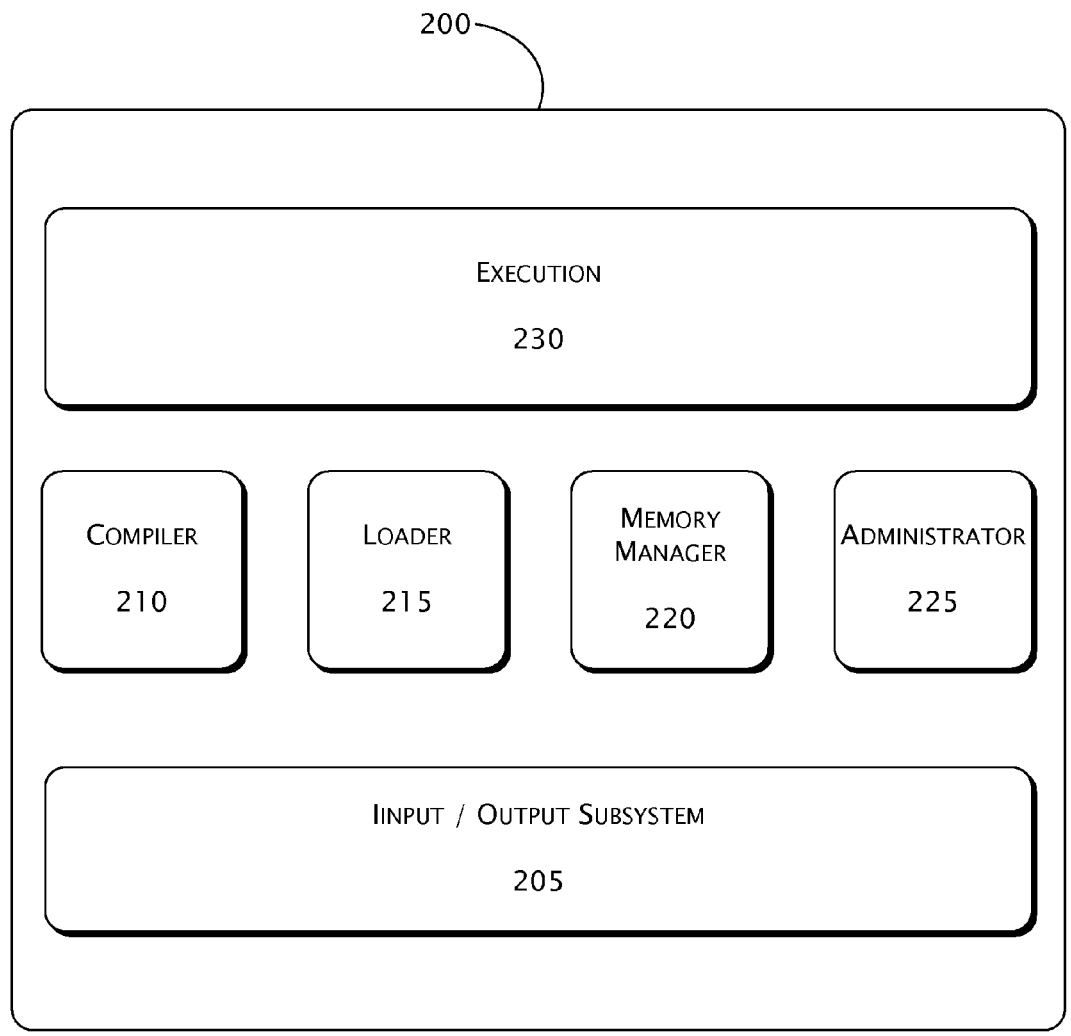
FIG. 2 shows an example of an execution environment for implementing example technologies related to adaptive compiled code.

FIG. 2 shows an example of runtime execution environment 200 in which example technologies may be implemented for compiling adaptive code 120 (see FIG. 1) and executing one or more applications, programs, functions, other code having at least one adaptive compiled module.

Figure 3:
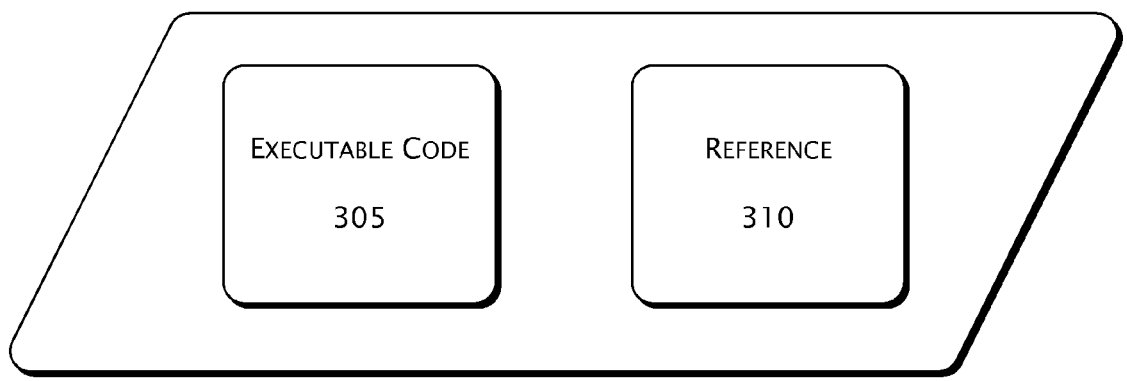
FIG. 3 shows an example data structure for adaptive compiled code.
Figure 4:
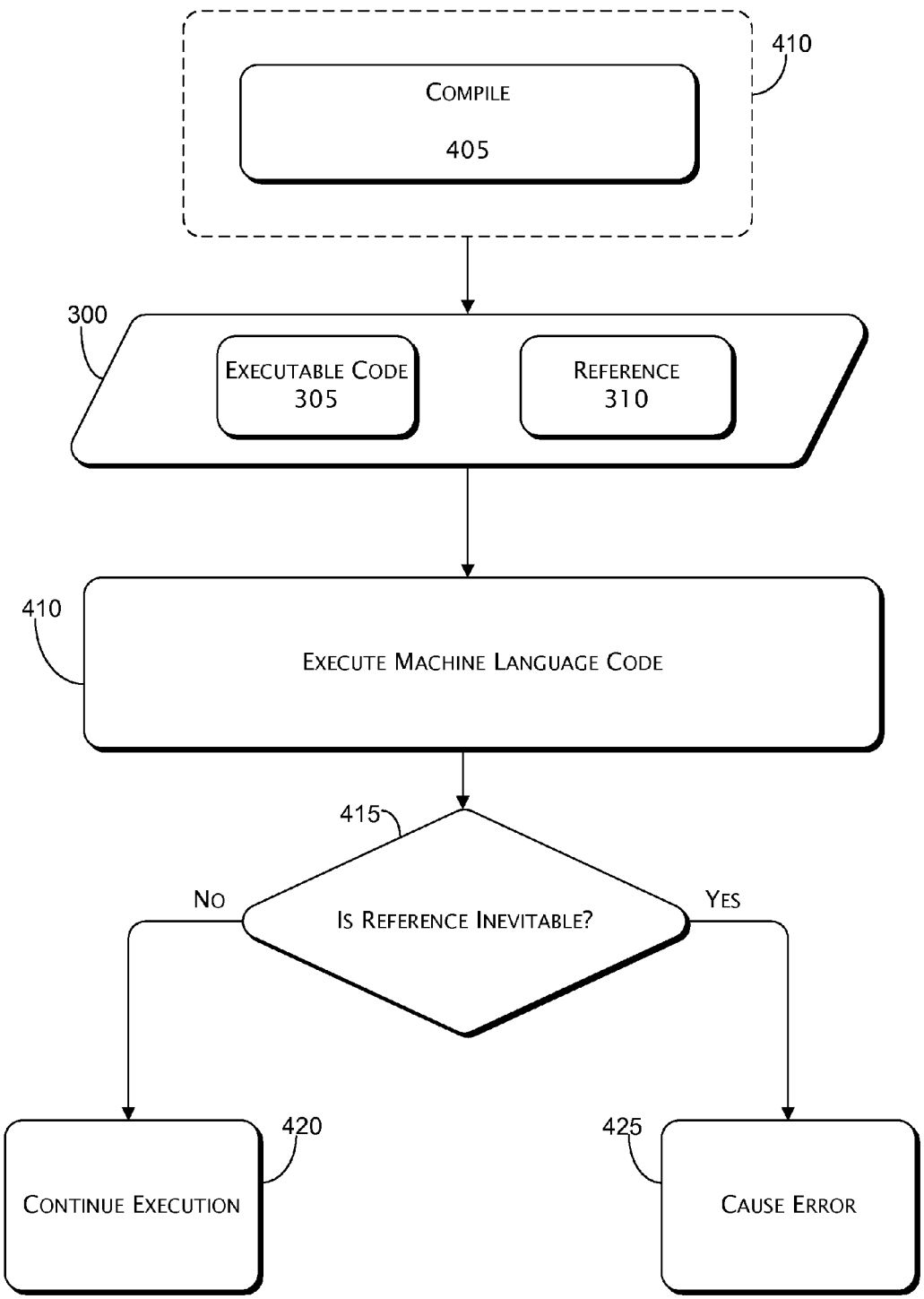
FIG. 4 shows an example data flow for implementing example technologies related to adaptive compiled code.

In the description of the modules of FIG. 2, which may also be referred to by the descriptions of FIGS. 3 and 4, various operations may be described as being performed by different components of runtime execution environment 200. The operations that are described with respect to a particular component may be carried out by the particular components itself, by the particular component in cooperation with another of the components of runtime execution environment 200, or by the particular components in cooperation with a processing component from an unmanaged execution environment. Thus, the descriptions provided herein pertain to example implementations, and are not intended to be limiting in any manner.

Accordingly, runtime execution environment 200 may facilitate execution of managed code for either of an application programming or application execution platform. Managed code may be considered to be part of a core set of application-development technologies, and may further be regarded as code that is compiled for execution on runtime execution environment 200 to provide a corresponding service to the computing device platform. In addition, runtime execution environment 200 may translate managed code at an interpretive level into instructions that may be proxied and then executed by a processor. A framework for runtime execution environment 200 also provides class libraries, which may be regarded as software building blocks for managed applications.

According to a further example implementation, runtime execution environment 200 may provide at least partial functionality that may otherwise be expected from a kernel, which may or may not be lacking from a computing device platform depending upon resource constraints for the particular one of device 105, 110, and 115. Thus, at least one example of runtime execution environment 200 may implement the following: input/output (hereafter "I/O") routine management, memory management, compilation, and service routine execution. Thus, runtime execution environment 200 may include I/O module 205, compiler 210, loader 215, memory management component 220 (alternatively referred to as a virtual machine), and service routine manager 225. These components are to be described in further detail below, and are provided only as examples, and may be implemented in examples of runtime execution environment 200 in various combinations and configurations thereof. The examples are not intended to be limiting to any particular implementation of a runtime execution environment, and no such inference should be made.

I/O module 205 of runtime execution environment 200 may provide asynchronous access to data sources (ie., processor and peripherals) associated with either of an application programming or application execution platform. More particularly, I/O module 205 may provide runtime execution environment 200 with robust system throughput and further streamline performance of code from which an I/O request originates.

Compiler 210 may refer to a module within runtime execution environment 200 that may interpret compiled IL into native machine instructions for execution in runtime execution environment 200 by, e.g., execution module 230 or, alternatively, for execution by a CPU in a non-managed execution environment.

Loader 215 may refer to an assembly manager that may be invoked to locate and read assemblies as needed. Loader 215 may be disposed in execution environment 200, although at least one implementation of an unmanaged execution environment (ie., OS) may include loader 215 therein. Loader 215 may garner precompiled IL during deployment or install time, for loading into runtime execution environment 200. Thus, according to at least one alternative implementation of runtime execution environment 200, loader 215 may effectively serve as an entry point for precompiled IL into runtime execution environment 200.

Memory management component 220 may be regarded as a "garbage collector." Garbage collection may be regarded as a robust feature of managed code execution environments by which an object is automatically freed (ie., de-allocated) if an object is no longer used by any applications, upon a sweep or scan of a memory heap. In at least one example of memory management component 210, a sweep of free memory heap may be implemented as a linear search. Such implementation may be well-suited for an example of a computing device platform for which memory size is constrained and for which a delay in completion of a sweep may be perceived by a user of a corresponding device.

Further functions implemented by memory management component 220 may include: managing one or more contiguous blocks of finite volatile RAM (ie., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Administrator 225 may refer to a module within runtime execution environment 200 that serves to receive, verify, and administer execution of at least a portion of an application, program, method, function, or other assemblage of code in runtime execution environment 200. In accordance with at least one example implementation of technologies associated with compiled adaptive code 120, administrator 225 may control the behavior of the application, program, method, function, or other assemblage code in runtime execution environment 220 without touching or affecting any executable portion thereof, at compile time, initial runtime, or at any time thereafter during execution of an application. More particularly, administrator 225 may enforce type matching for code compiled by compiler 210 or loaded by loader 215. That is, administrator 225 may compare types or members of types requested by at least a portion of the code to the types or members of types used to satisfy those requests, in searching of satisfying matches. In the event that such a match does not exist for a respective request, administrator 225 may instruct execution module 230 to proceed with execution of the code compiled by compiler 210 or loaded by loader 215 until a request for the missing type or member of the missing type is at least statistically inevitable.

Execution module 230 may enable execution of managed code (ie., compiled native code) for the computing device platform. Execution module 230 may be regarded as a module in which execution of the code compiled by compiler 210 or loaded by loader 215 may be implemented in runtime execution environment 200, and in which runtime services (e.g., device access and memory management) may be provided.

FIG. 3 shows example data structure 300 in accordance with one or more example technologies associated with adaptive compiled code 120 (see FIG. 1). More particularly, data structure 300 may represent at least a portion of compiled code corresponding to an application, program, or function that includes a reference to a type or member of a type that is missing. According to implementations of adaptive compiled code 120, an error associated with the missing type, or missing type member, may be deferred until a call to the reference is, at least, statistically inevitable. This implementation scenario may occur, typically though by no means exclusively, when the application, program, function, or other assemblage of code to which data structure 300 corresponds attempts to run on an older, or otherwise different, version of the platform on which it is generated, and is subjected to a verification process at compile time, initial runtime, or at any time thereafter during execution of the application, program, function, or assemblage of code to which data structure 300 corresponds.

Module 305 may refer to one or more modules of executable instructions corresponding to an application, program, function, or other assemblage of code being executable in accordance with, e.g., execution component 230 in runtime execution environment 200 (see FIG. 2). More particularly, module 305 may refer to an entity such as methods, classes, DLLs (dynamic link libraries), frameworks, etc. Module 305 may be compiled by compiler 210 or loaded into runtime execution environment 200 by loader 215. That is, module 305 may be native code (ie., machine-readable code).

However, module 305 is not limited to the examples of native code only. Rather, alternative implementations of the technologies described herein may be application to code that is not compiled, and therefore be relevant to intermediate language code or other code written in any one of a variety of known languages for which at least one of multiple syntactic characteristics and construct properties may be sampled.

Module 310 may refer to a reference that is associated with module 305. More particularly, the reference of module 310 may be to a type or a member of a type that is not included in the application, program, function, or assemblage of code to which data structure 300 corresponds. However, in keeping with the example scenario in which implementations of adaptive compiled code 120 are presently described, it may be assembled for descriptive purposes only that the type, or at least one member of the type, to which the reference of module 310 corresponds is missing. Further, the referenced types, or members thereof, may be, but are by no means limited to, an integer, a floating point, a string, logical, or binary.

FIG. 4 shows example data flow 400 for producing and utilizing at least one example implementation of compiling and/or utilizing adaptive compiled code 120 (see FIG. 1).

In the following description, various operations will be described as being performed on or for one or more modules of data structure 300 (see FIG. 3) by components associated with runtime execution environment 200 (see FIG. 2). The operations that are described with respect to any particular one of these components may be carried out by the component itself, in combination with other components associated with the tool, or by the particular component in cooperation with one or more components of runtime execution environment 200. In addition, the operations may be executed by a processor or processors and implemented as hardware, firmware, or software, either singularly or in various combinations together. Further still, the operations may occur, typically though by no means exclusively, when the application, program, function, or other assemblage of code to which data structure 300 corresponds attempts to run on a different version of the platform on which it is generated, and is subjected to a verification process at compile time, initial runtime, or at any time thereafter during execution of the application, program, function, or assemblage of code to which data structure 300 corresponds.

Block 405 may refer to the compiling of code that results in data structure 300.

Environment 410 may be a managed execution environment, and block 405 may refer to a compiler interpreting IL into native machine instructions for execution in the managed execution environment or, alternatively, for execution by a CPU in a non-managed execution environment.

Environment 410 may, alternatively, refer to block 405 may refer to the compiling of at least a portion of an application, program, function, or other assemblage of code that is then loaded as one or more native image files in the aforementioned managed execution environment, thus circumventing CPU consumption required for compilation.

Data structure 300, as described above, may represent at least a portion of compiled code corresponding to an application, program, or function that includes a reference to a type or member of a type that is missing.

Module 305 may refer to one or more modules of executable instructions corresponding to an application, program, function, or other assemblage of code being executable in accordance with a managed execution environment. Module 305 may refer to an entity such as methods, classes, DLLs (dynamic link libraries), frameworks, etc.

Module 310 may refer to a reference to a type or a member of a type that is not included in the application, program, function, or assemblage of code to which data structure 300 corresponds.

Block 410 may refer to execution module 230 of runtime (ie., managed) execution environment 200 executing executable code 305 corresponding to data structure 300.

Decision 415 may refer to administrator 225 implementing a verification process with regard to the application, program, function, or assemblage of code to which data structure 300 corresponds. More particularly, administrator 225 may compare the types and members of types that may be requested during execution of executable code 305 to determine whether such requests are to be satisfied by the types and members of types found in the application, program, function, or assemblage of code to which data structure 300 corresponds.

The verification process implemented by administrator 225 may take place at compile time, initial runtime, or at any time thereafter during execution of the application, program, function, or assemblage of code to which data structure 300 corresponds. Therefore, at least portions of the functionality of administrator may occur at any point during data flow 400, and thus data flow 400, as depicted in FIG. 4 and described herein, is provided as an example only. That is, alternative implementations of data flow 400 are not beholden to the order shown and described here.

Regardless, as the verification process reveals that a type or a member of a type that is subject to reference 310 is not included in the application, program, function, or assemblage of code to which data structure 300 corresponds, reference 310 may be flagged or otherwise noted without requiring an interruption to the execution of the application, program, function, or assemblage of code to which data structure 300 corresponds. Further, according to at least one implementation of data flow 400, administrator 225 may statistically determine a likelihood or probability that reference 310 to the missing type or type member may be called as other modules of executable code are executed.

Negative decision 420 may result in the continued execution of executable code 305 and other executable code modules associated with the application, program, function, or assemblage of code to which data structure 300 corresponds. That is, even though reference 310 is to a type or member of a type that is not present in the application, program, function, or assemblage of code to which data structure 300 corresponds, reference 310 does not cause an error according to implementations of technologies associated with adaptive compiled code 120.

Positive decision 425 may result as a statistical inevitability, as determined by administrator 225, during the execution of the application, program, function, or assemblage of code to which data structure 300 corresponds, or simply as a result of reference 310 to a missing type or type member being called.

That is, if the execution of modules of executable code for the application, program, function, or assemblage of code to which data structure 300, and therefore reference 310, corresponds reaches a point of statistical inevitability that reference 310 to a missing type or type member is to be called, the managed execution environment may cause an error. Alternatively, the managed execution environment may cause an error simply when reference 310 to a missing type or type member is called. A non-limiting example of such error may be throwing an exception.

Thus, by the description above, pertaining to FIGS. 1-4, an error associated with a reference to a missing type or type member may be deferred until runtime, when a reference to a missing type or type member may actually be called.

However, the example implementations described herein are not limited to just the environment of FIG. 1, components of FIG. 2, modules of FIG. 3, or the process of FIG. 4. Technologies (e.g., tools, methodologies, and systems) associated with adaptive compiled code 120 (see FIG. 1) may be implemented by various combinations of the features described with reference to FIGS. 2-4.

Further, the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that code module initialization may be implemented without one or more of the specific details, or with other methods, resources, materials, etc. In other instances, well known structures, resources, or operations have not been shown or described in detail merely to avoid obscuring aspects of the invention.

While example implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method performed by one or more hardware processing devices of a computing device, the method comprising:
   obtaining source code having a reference to a missing type or a missing type member;
   compiling or interpreting the source code into native executable machine code for execution by the one or more hardware processing devices of the computing device, wherein the native executable machine code has the reference to the missing type or the missing type member; and
   managing execution of the native executable machine code with a runtime execution environment, the managing comprising:
   beginning execution of the native executable machine code that has the reference to the missing type or the missing type member;
   continuing the execution of the native machine code while checking whether the reference to the missing type or the missing type member will be called by the native executable machine code; and
   causing an error in an instance when the checking indicates that the reference to the missing type or the missing type member will be called by continuing the execution of the native executable machine code, wherein the error is caused before the reference to the missing type or the missing type member is called,
   wherein the reference in the native executable machine code refers to an integer, a floating point, or a string that is missing from the native executable machine code.

2. The method according to claim 1, wherein the compiling or interpreting comprises:
   compiling the source code into intermediate language code.

3. The method according to claim 2, wherein the compiling or interpreting comprises:
   interpreting the intermediate language code into the native executable machine code.

4. The method according to claim 1, wherein the reference to the missing type or the missing type member is included in a compiled data structure of the native executable machine code.

5. The method according to claim 1, wherein the source code is compiled or interpreted into the native executable machine code outside of the runtime execution environment.

6. The method according to claim 1, wherein the causing the error is performed when the checking indicates that calling of the reference is inevitable.

7. The method according to claim 1, wherein the error comprises an exception.

8. A computing device comprising:
   one or more hardware processing devices; and
   one or more volatile or non-volatile computer readable memory devices having stored thereon instructions which, when executed by the one or more hardware processing devices, cause the one or more hardware processing devices to:
   obtain code having a reference to a type or type member;
   convert the code into native machine code for execution by the one or more hardware processing devices of the computing device, wherein the native machine code has the reference to the type or the type member but the type or the type member is missing from the native machine code, the type or the type member comprising an integer, a floating point, or a string; and
   manage execution of the native machine code with a managed execution environment that is configured to:
   begin execution of the native machine code having the reference to the type or the type member that is missing from the native machine code;
   continue execution of the native machine code while the native machine code does not call the reference to the type or the type member that is missing from the native machine code;
   determine that continued execution of the native machine code will result in a call to the reference by the native machine code; and
   cause an error prior to the call to the reference by the native machine code.

9. The computing device of claim 8, wherein the code is converted by at least one of compiling or interpreting.

10. The computing device of claim 8, wherein the error is an exception that is thrown prior to the call to the reference.

11. The computing device of claim 8, wherein the code is obtained as source code.

12. The computing device of claim 8, wherein the code is obtained as intermediate language code.

13. One or more volatile or non-volatile computer-readable memory devices, optical storage devices, or magnetic storage devices storing computer readable instructions which, when executed by one or more hardware processing devices, cause the one or more hardware processing devices to perform acts comprising:
   obtaining executable machine code for execution by the one or more processing devices, wherein the executable machine code has a reference to a missing type or a missing type member, the missing type or the missing type member comprising an integer, a floating point, or a string;
   managing execution of the executable machine code by a runtime execution environment, the managing comprising:
   causing the executable machine code that has the reference to the missing type or the missing type member to begin executing;
   as the executable machine code is being executed, checking whether the reference to the missing type or the missing type member will be called by the executable machine code;
   continuing to execute the executable machine code until the checking indicates that the reference to the missing type or the missing type member will be called by continued execution of the executable machine code; and when the checking indicates that the reference to the missing type or the missing type member will be called by the continued execution of the executable machine code, causing an error prior to calling of the reference by the executable machine code.

14. The one or more volatile or non-volatile computer-readable memory devices, optical storage devices, or magnetic storage devices of claim 13, wherein the causing the error comprises throwing an exception.

15. The one or more volatile or non-volatile computer-readable memory devices, optical storage devices, or magnetic storage devices of claim 13, wherein the missing type or the missing type member is missing from a first version of a platform in which the executable machine code executes and is present in a second version of the platform.

16. The one or more volatile or non-volatile computer-readable memory devices, optical storage devices, or magnetic storage devices of claim 13, wherein the obtaining comprises compiling or interpreting source code into the executable machine code.

17. The one or more volatile or non-volatile computer-readable memory devices, optical storage devices, or magnetic storage devices of claim 13, wherein the obtaining comprises compiling or interpreting intermediate language code into the executable machine code.

18. The one or more volatile or non-volatile computer-readable memory devices, optical storage devices, or magnetic storage devices of claim 13, wherein the reference is to the missing type.

19. The one or more volatile or non-volatile computer-readable memory devices, optical storage devices, or magnetic storage devices of claim 13, wherein the reference is to the missing type member.

20. The one or more volatile or non-volatile computer-readable memory devices, optical storage devices, or magnetic storage devices of claim 13, wherein the executable machine code includes precompiled code and the obtaining comprises loading the precompiled code into the runtime execution environment.

* * * * *